Oct. 14, 1941.                P. R. LEE                2,259,312
                 METHOD OF MANUFACTURING THERMOSTATIC DEVICES
                    Filed Jan. 12, 1939        3 Sheets-Sheet 1
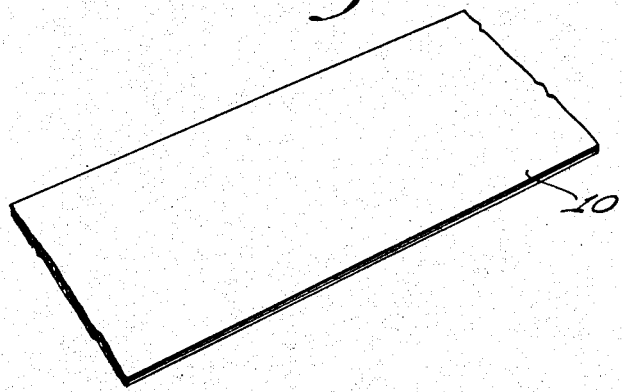
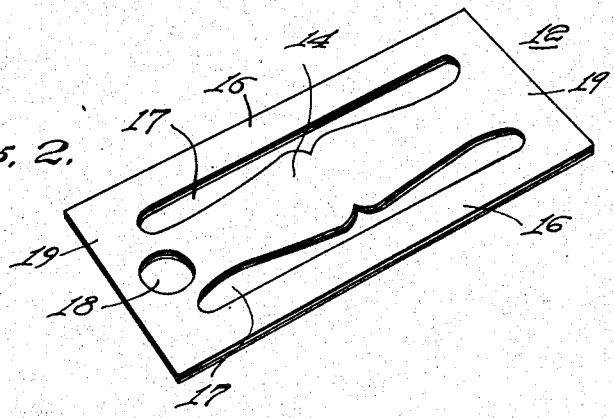
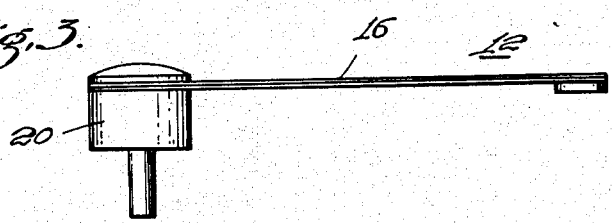
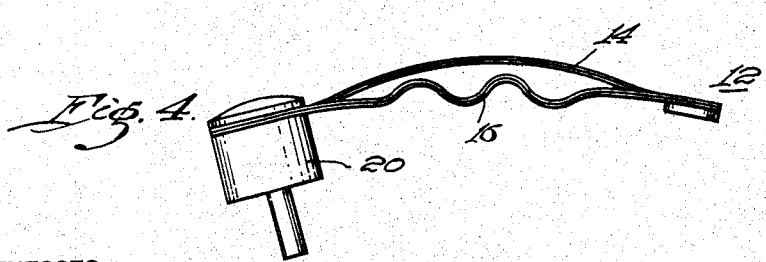
WITNESSES:
INVENTOR
Paul R. Lee.
BY
ATTORNEY Oct. 14, 1941.     P. R. LEE     2,259,312
METHOD OF MANUFACTURING THERMOSTATIC DEVICES
Filed Jan. 12, 1939     3 Sheets-Sheet 2
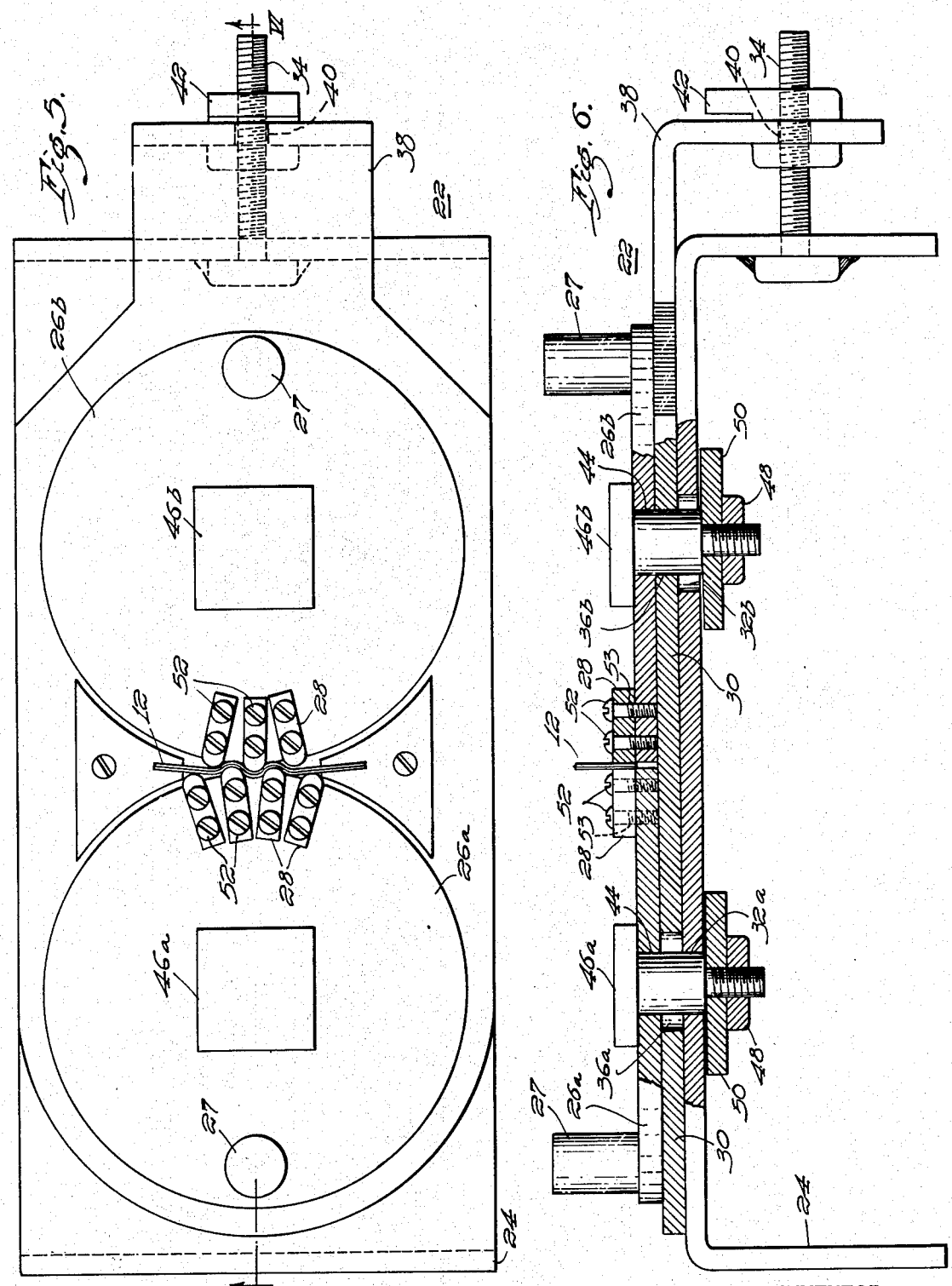
INVENTOR
Paul R. Lee.
BY
W R Coley
ATTORNEY Oct. 14, 1941.  P. R. LEE  2,259,312
METHOD OF MANUFACTURING THERMOSTATIC DEVICES
Filed Jan. 12, 1939  3 Sheets-Sheet 3
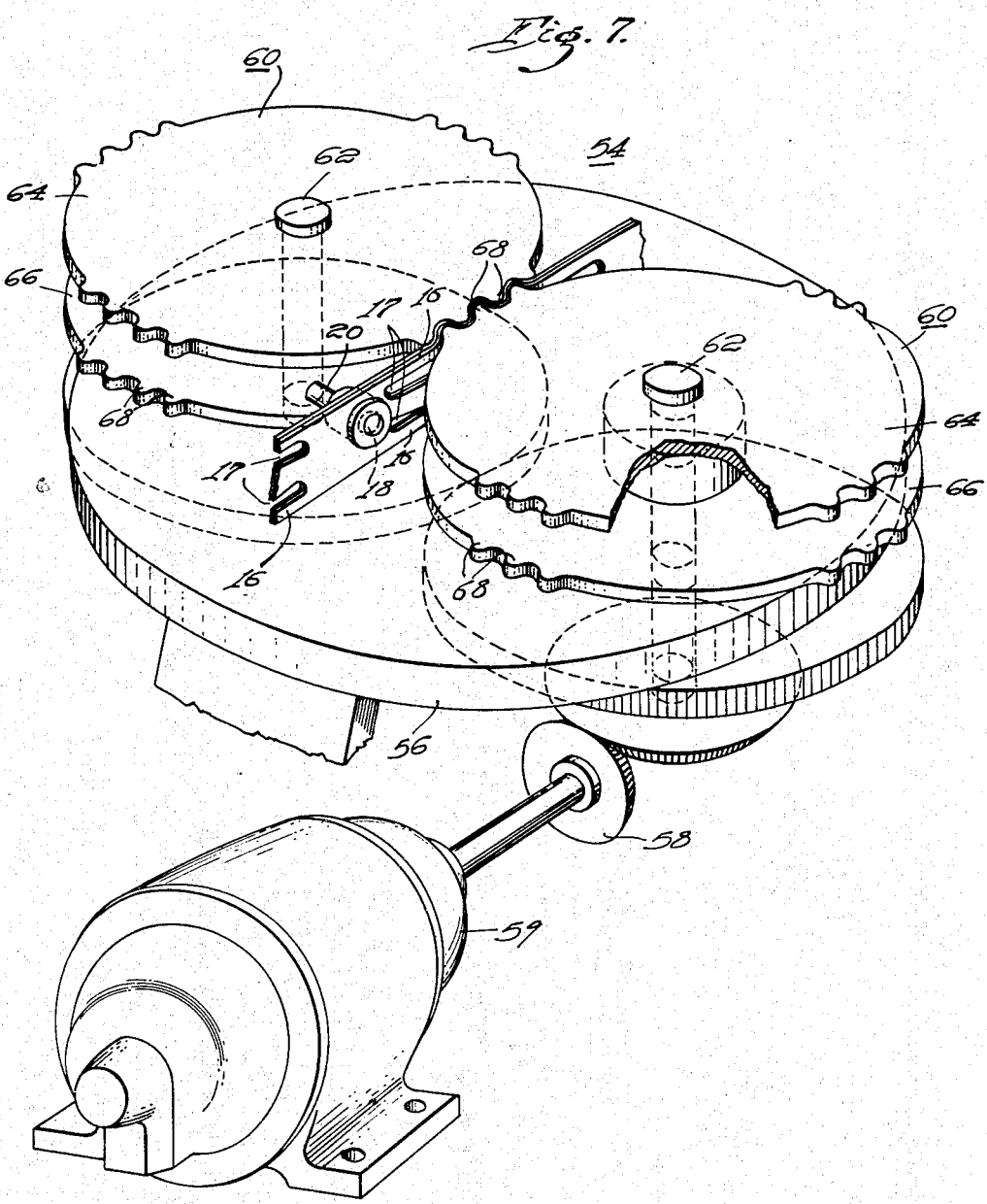
WITNESSES:
INVENTOR
Paul R. Lee.
BY
W. R. Coley
ATTORNEY Patented Oct. 14, 1941

2,259,312

UNITED STATES PATENT OFFICE 2,259,312

METHOD OF MANUFACTURING THERMOSTATIC DEVICES

Paul R. Lee, Mansfield, Ohio, assignor to Westinghouse Electric & Manufacturing Company, East Pittsburgh, Pa., a corporation of Pennsylvania Application January 12, 1939, Serial No. 250,538

4 Claims. (Cl. 29—148)

My invention relates to bimetallic thermostats, and more particularly to the method of manufacturing bimetallic members therefor.

An important well-known step in manufacturing a snap-acting bimetallic member, in addition to blanking, forming and ageing, is cooking such member in preforming clamps at a given temperature. The main object of cooking or heat-treating the bimetallic member in clamps has been to introduce a preset curvature in the member and thus to raise the snapping temperatures of such member to a given predetermined value. However, this operation raises both the opening and closing temperatures of such member. Accordingly, the forming operation was introduced to provide the desired differential between the opening and closing values; namely, by lowering the closing and raising the opening temperature value. The two-step operation of the prior art, while to a small degree producing the desired operating characteristics in a bimetallic member, has been quite expensive and uncertain in its results. Furthermore, such operations do not readily lend themselves to mass-production methods, and at the same time, do not afford the desired control over the exact setting of the operating limits of the member.

It is, therefore, an object of my invention to provide a method of forming a bimetallic member which, while lending itself very favorably to mass-production methods, eliminates the need of following the common practice of cooking the member in clamps.

A further object of my invention is to provide a method of forming a bimetallic member at room temperature which simultaneously determines the snapping temperature and the differential between the opening and closing temperatures of such member.

Other objects of my invention will either be pointed out specifically in the course of the following description of a method of forming my device embodying my invention, or will be apparent from such description.

In the accompanying drawings:

Figure 1 is a perspective view of a blank sheet of bimetallic material;

Fig. 2 is a perspective view of a thermostatic device or element punched from the blank sheet;

Fig. 3 is a side elevational view of the bimetallic member and mounting device;

Fig. 4 is a side elevational view of the bimetallic device in its final form;

Fig. 5 is a top plan view of a mechanical deformation device which may be employed in my invention;

Fig. 6 is a view, partly in section and partly in elevation, taken along the line VI—VI of Fig. 5; and Fig. 7 is a perspective view of a mass production mechanical deformation device used in manufacturing the bimetallic members in accordance with the teachings of my invention.

Referring to the accompanying drawings, I illustrate a method of producing a snap-acting bimetallic or composite heat-responsive member which is formed by suitably stamping or punching a blank sheet of bimetallic material 10 to form a bimetallic link 12 having a central strip 14 and two lateral strips 16, and then mechanically deforming the link 12 so as to produce a predetermined general curvature of the link and to crimp the lateral strips thereof.

More specifically, the bimetallic link 12 includes the central strip 14 and two lateral strips 16 which are formed by means of laterally positioned elongated slots 17, and transverse end portions 19. A circular aperture 18 may be positioned within an end portion 19 and extend somewhat into the central strip 14, or such aperture may be totally within the central strip 14 and near the end portion 19. Moreover, it is to be understood that the aperture 18 may be positioned elsewhere if desired.

The bimetallic link 12 is formed of a suitable composite or bimetallic heat-responsive material which will change its shape with a change in temperature thereof in a predetermined manner. A mounting rivet 20 is rigidly attached to the bimetallic link 12 through the aperture 18. The rivet 20 extends, in this instance, along the central strip 14 and affords means for rigidly mounting the bimetallic member 12 after having been formed, as hereinafter described, to any suitable supporting structure (not shown). The exact method of mounting the bimetallic member 12 is more clearly described in a co-pending application, Serial No. 225,354, filed August 17, 1938, assigned to the assignee of this application.

Referring to Figs. 5 and 6, I show a hand-operated mechanical deformation device 22 comprising a supporting structure 24, a plurality of discs 26a and 26b having adjustable teeth 28 located thereon, and an adjusting rack 30 movably positioned upon the supporting structure 24 and directly associated with the discs 26b. The supporting structure 24 is, in this instance, substantially a U-shaped metallic member having a plurality of apertures 32a and 32b positioned within and along the longitudinal axis of the top portion thereof and a threaded shaft or screw 34 rigidly attached at one end thereof.

The adjusting rack 30 is positioned upon the top surface of the supporting structure 24 and has a plurality of apertures 36a and 36b located therein which are substantially in line with the apertures 32a and 32b, respectively, in the supporting structure 24. The adjusting rack 30 has a depending end portion 38 located at one end thereof. An aperture 40 is located within the depending portion 38 and cooperates with the adjusting screw or shaft 34. An adjusting nut 42 is rotatively associated with the depending portion 38 of adjusting rack 30 and is threadedly engaged with the screw or shaft 34. The rack 30 may then be moved longitudinally with respect to the supporting structure 24 by merely rotating the adjusting nut 42.

The discs 26a and 26b are positioned upon the adjusting rack 30 in line with the apertures 32a and 32b, and 36a and 36b, respectively, and have apertures 44 located substantially at the midpoints thereof. Shoulder screws 46a and 46b are positioned through the discs 26a and 26b, respectively, and the corresponding apertures 44, 36a or 36b and 32a or 32b, respectively, to provide a bearing for the discs 26a and 26b.

The bolts 46a and 46b may be rigidly attached to the supporting structure 24 by means of suitable nuts 48 and washers 50. The disc 26a is positioned at substantially a fixed point inasmuch as the shoulder bolt 46a is of substantially the same diameter as the aperture 32a in the supporting structure 24. The disc 26b is substantially fixed in its position with respect to the adjusting rack 30 and movable with respect to the supporting structure 24, inasmuch as there is substantially a tight fit between the adjusting rack 30 and the bolt 46b. The aperture 32b, in supporting rack 24, is considerably larger than the bolt 46b and aperture 36a in adjusting in rack 30, is considerably larger than bolt 46a. Accordingly, it follows that, the adjusting plate 30 may be moved with respect to support 24 and disc 26b will move simultaneously with the movements of the adjusting rack 30, while disc 26a will remain in substantially a fixed position. In other words, as the adjusting nut 42 is rotated, the relative position between the disc 26b and disc 26a will be adjustably varied for a purpose hereinafter described.

The teeth 28 are adjustably positioned upon the discs 26a and 26b by means of suitable set screws 52. The set screws are rigidly attached to the discs 26a and 26b and are inserted through slotted apertures 53 in the teeth 28. Accordingly, it is obvious that the teeth 28 may be adjusted with respect to the corresponding discs 26a and 26b, or in other words, the pitch of the meshing teeth 28 may be adjustably varied with respect to the position of the axes of the respective discs 26a and 26b. It is, therefore, obvious that the discs 26a and 26b may be adjustably separated and that the teeth 28 may be adjustably positioned with respect to each other and to the corresponding discs 26a and 26b.

The mechanical deformation device 22 may be used to mechanically deform the bimetallic link 12 at room temperature substantially as follows. The link 12, including the rivet 20 located thereon, may be positioned upon the device 22 with one end thereof engaging the cooperating teeth 28. The discs 26a and 26b are then rotated by means of suitable handles 27 so that the bimetallic member 12 will be drawn therebetween. The teeth 28 will then engage, in this instance, only the lower lateral strip 16, causing the bimetallic member 12 to take an over-all curvature and simultaneously, to crimp the central portion of the lower lateral strip 16. The bimetallic member 12 is then inverted and passed through the rotating teeth 28, however, in a reversed direction, so that the remaining lateral strip will be crimped. By inverting and passing the member 12 through the rotating teeth in a reverse direction, it is obvious that the previously determined over-all curvature of the member 12 will be maintained, and the crimps formed in the second lateral strip will be substantially the same as those in the first strip. In other words, both the lateral strips 16 will then be correspondingly mechanically deformed and bimetallic member 12 will then be simultaneously forced into a general curved shape, as shown in Fig. 4.

It is obvious that the mechanical deformation device 22 as hereinabove described, simultaneously subjects the one and then the other of the lateral strips of the member 12 to a mechanical crimping deformation and produces a general curvature in the bimetallic member 12 at room temperature. However, it is obvious that the device 22 will be somewhat slow in its operation inasmuch as the link 12 must be inverted and passed twice through the discs 26a and 26b before being in its final form. However, the device illustrated in Fig. 7 and hereinafter described deforms a continuous passage of bimetallic members, in line with the teachings of my invention, with a maximum speed and with a minimum amount of handling, and, therefore, greatly increases the production of the bimetallic members.

By having the teeth 28 adjustable, it is possible to adjust and control the curvature of the finished bimetallic member 12, and by having the disc 26b movable with respect to the disc 26a, the depth of the crimping within the lateral strips 16 may be adjusted. Accordingly, inasmuch as the fixed curvature of the bimetallic member 12 determines the operating or snapping temperature of such member, it is obvious that the operating temperatures of the bimetallic member may be adjustably varied by determining the fixed curvature thereof. In addition, inasmuch as the depth of the crimping deformations in the lateral strips may be varied, it is likewise obvious that the lower and upper operating limits of the bimetallic member may be simultaneously varied. It is to be understood that these operations are performed at room temperature.

If it be desired to manufacture the bimetallic link 12 in a mass production process, a mechanical deforming device 54 (see Fig. 7) may be used. The device 54 comprises a supporting structure 56, driving gears 58 and double deforming gears 60 operatively associated with the driving mechanism 58 and a suitable power supplying motor 59. The gears 60 are rotatively attached to the supporting structure 56 by suitable pins 62 and may be formed of an upper and lower plate 64 and 66, respectively. The plates 64 and 66 have cooperating teeth 68 therein which tend to crimp the lateral strip 16 of the bimetallic link 12 in a predetermined manner, as hereinabove described. The teeth 68 are located in the upper plate 64 and directly below in the lower plate 66. Accordingly, it is obvious that the link 12 may be fed through the gears 60 so that both lateral strips 16 may be simultaneously crimped. In addition, inasmuch as there is a gap between the upper and lower plates, the supporting rivet 20 may also be rigidly attached to the link 12 before being associated with the device 54. Further, if desired, the link 12 may be partially punched from an elongated strip or blank 10, which in turn, may be inserted into the gars 60 which will successively deform spaced link portions of the elongated strip. The links may then be severed one from another by a suitable operation.

The link 12 after being formed at or about room temperature, substantially as hereinabove described, is subjected to an aging operation. The aging step comprises heat treating the link in a bath, well above the normal operating range of the link, say 500° F. to 800° F. in a well known manner.

Various other modifications may be made in the device embodying my invention without departing from the spirit and scope thereof, and I desire, therefore, that only such limitations shall be placed thereon as are imposed by the appended claims.

I claim as my invention:

1. The method of manufacturing slotted thermostatic devices, which comprises cutting a piece of composite thermostatic material to a form having a central strip and two lateral strips, and thereafter subjecting the lateral strips to separately adjustable mechanical deformations for producing a general curvature of the device and for determining the operating limits of such device.

2. The method of manufacturing slotted thermostatic devices, which comprises cutting a piece of composite thermostatic material to a form having a central strip and two lateral strips, and thereafter subjecting the material to adjustable mechanical deformations for crimping the lateral strips to a preselected depth to determine the operating limits of the device and for producing a preselected degree of smooth curvature of such material to provide a preselected operating temperature of the device.

3. The method of manufacturing slotted thermostatic devices, which comprises cutting a piece of composite thermostatic material to a form having a central strip and two lateral strips, subjecting the lateral strips to mechanical deformations, and thereafter heating the material to a temperature above the normal working range of the device.

4. The method of manufacturing slotted thermostatic devices, which comprises cutting a piece of composite thermostatic material to a form having a central strip and two lateral strips, subjecting the material to predetermined mechanical deformations for crimping the lateral strips and for producing a curvature of such material, and thereafter heating the material to a temperature above the normal working range of the device.

PAUL R. LEE.